United States Patent [19]

Hirose

[11] 4,421,441

[45] Dec. 20, 1983

[54] CYCLIC DRILLING MACHINE

[75] Inventor: Noboru Hirose, Nagoya, Japan

[73] Assignee: Brother Kogyo Kabushiki Kaisha, Nagoya, Japan

[21] Appl. No.: 314,475

[22] Filed: Oct. 23, 1981

[30] Foreign Application Priority Data

Oct. 29, 1980 [JP] Japan ................. 55-151644

[51] Int. Cl.³ .............................. B23B 47/34
[52] U.S. Cl. ....................... 408/17; 408/11; 403/105
[58] Field of Search .......... 408/10, 11, 17, 130; 173/5, 12, 19; 74/840; 403/105, 374, DIG. 6

[56] References Cited

U.S. PATENT DOCUMENTS

| | | | |
|---|---|---|---|
| 3,637,318 | 1/1972 | Hayes | 408/17 |
| 4,123,188 | 10/1978 | Deremo et al. | 408/17 |
| 4,350,212 | 7/1982 | Hirose | 408/10 |

FOREIGN PATENT DOCUMENTS

52-26834 10/1977 Japan .................... 408/17

Primary Examiner—William R. Briggs
Assistant Examiner—Daniel W. Howell
Attorney, Agent, or Firm—Browdy and Neimark

[57] ABSTRACT

A drilling machine provided with a feed control device. The feed control device includes a hydraulic cylinder to be engaged with a quill, which is reciprocated by a pneumatic feed device, on the forward midway thereof, a slidable member disposed on a frame in such a manner as to be able to move by a predetermined distance in the movement direction of a ram of the hydraulic cylinder, and coupling device retained on the slidable member for linking the slidable member and the ram. When the quill is once returned backwards in the course of a drilling cycle the ram is also returned backwards together with the slidable member by the predetermined distance, and when the quill is moved forward again the quill is engaged with the ram at a position a little short of the position where the previous drilling cycle was interrupted for being switched there from rapid speed down to slow speed.

6 Claims, 10 Drawing Figures

CYCLIC DRILLING MACHINE

BACKGROUND OF THE INVENTION

This invention relates to a cyclic drilling machine in which one drilling process is carried out, instead of being performed in a single stroke, by gradually deepening a bore-depth by means of repeating reciprocative movement of a tool for a plurality of times before completing the drilling process.

More particularly the invention relates to a cyclic drilling machine, wherein when a tool which has been, after having been advanced forward to a little short position to a workpiece at rapid speed and then switched to slow drilling speed for a drilling operation, once returned at rapid speed and advanced forward again it is moved as far as a little short of the terminal of the previous drilling cycle at rapid speed before being switched down there to the drilling speed so that the tool can be prevented from any damage.

A drilling machine of this category disclosed in a Japanese publication TOKU-KO-SHO No. 52(1977)-26834 is provided in general with feed means for reciprocating a quill which retains a spindle, a guide rod disposed in parallel with the quill for being moved therewith, a position memory member retained on the guide rod for memorizing a position where previous drilling operation was interrupted, by the action of a spring which is slidable against friction force along the guide rod, a feed control switch disposed on a frame for switching the rapid feed speed of the quill, on the way of advancing, down to the slow feed speed upon engagement with the position memory member, and an engaging portion disposed on the frame for blocking the movement of the position memory member when the latter engages on the former in the course of advancing of the quill. When the position memory member engages the feed control switch while the tool is advanced forward at rapid feed speed, the feed speed of the tool is switched down to the slow feed speed and the position memory member is further advanced by a small distance until the position memory member is halted owing to engagement with the engaging portion. The position memory member is therefore relatively moved to the guide rod. When the quill is returned from a midway of drilling operation, the position memory member is returned together with the guide rod. When the quill is advanced again the position memory member is engaged with the feed control switch, so that the feed speed of the quill is switched down from the rapid feed speed to the slow feed speed at a position this side of the previous drilling operation interrupted position by the movement amount of the position memory member after engagement thereof with the feed control switch till engagement thereof with the engaging portion.

As the position memory member is retained on the guide rod due to the action of a spring, in the conventional machine as mentioned above, possible loosening of the spring because of usage thereof for a long time, may cause an unexpected happening of accidental moving of the position memory member owing to its dead weight, if and when the whole of the apparatus is placed vertically or under a certain inclination, or uncertain operation of the feed control switch by the position memory member. This will cause an uncertain speed switching of the tool from rapid to slow. In such an instance the tool is liable to strike against or come to impact the workpiece at the rapid speed, being thereby seriously damaged, to the great disadvantage. Besides, the feed of the tool is performed by the fluid pressure actuator, while the reciprocation thereof is controlled according to electric signal from the feed control switch or the like, in the abovementioned prior art, and the switching from the slow feed to the rapid feed is made by a control valve. Such structure of the conventional machine necessitates the control valve, electromagnetic means for operating the same, pipings as passages for the fluid pressure, etc., which inevitably enlarges the size of the apparatuses.

SUMMARY OF THE INVENTION

The primary object of this invention, which was made from such a background, is therefore to provide a cyclic drilling machine relieved to a greatest possible extent of a risk for a drilling tool to be struck against a workpiece in the course of a drilling operation.

Another object of this invention is to provide a drilling machine relieved of the fear of striking of the tool against the workpiece even in an unexpected case of damage of position memory means which memorizes terminal or interrupted point position of a drilling cycle.

Another object of this invention is to provide a cyclic drilling machine equipped with position memory means which is surely operable and highly durable.

Still another object of this invention is to provide a cyclic drilling machine which is allowed to be of small size by means of eliminating an electromagnetic valve for switching the feed speed of the drilling tool, from rapid to slow, suited for the drilling operation and an electromagnetic apparatus for the switching of the valve.

A preferable embodiment of a cyclic drilling machine according to this invention comprises a frame, a quill reciprocably mounted in the frame, a spindle rotatably mounted in the quill and having a tool at one end thereof, a motor operatively connected with the spindle for rotating the same, pneumatic feed means for reciprocating the quill in forward and backward directions, operation control means for controlling the pneumatic feed means to make the quill repeat a drilling cycle wherein the quill once returns on the way of drilling operation and advances again for resuming the drilling operation, feed control means for controlling feed speed of the quill, and position memory means for memorizing terminal of a previous drilling cycle. The feed control means includes a rod member which is regulated of its forward movement speed at a predetermined value by regulating means and always biased in backward direction, and engaging means for engaging the quill and the rod member in the course of forward movement thereof. And the position memory means includes a slidable member movably disposed within a predetermined distance in movement direction of the rod member, and coupling means for coupling the slidable member to the rod member to move the slidable member with the rod member by the predetermined distance when the rod member moves in forward direction of the quill and thereafter for permitting the rod member to forwardly move relatively to the slide member, said coupling means being adapted to couple said slidable member to the rod member to move the former with the latter by the predetermined distance when the rod member moves in backward direction by the biasing means and then to stop backward movement of the rod member.

DETAILED DESCRIPTION OF THE PREFERRED EMBODIMENT

Figure 1:
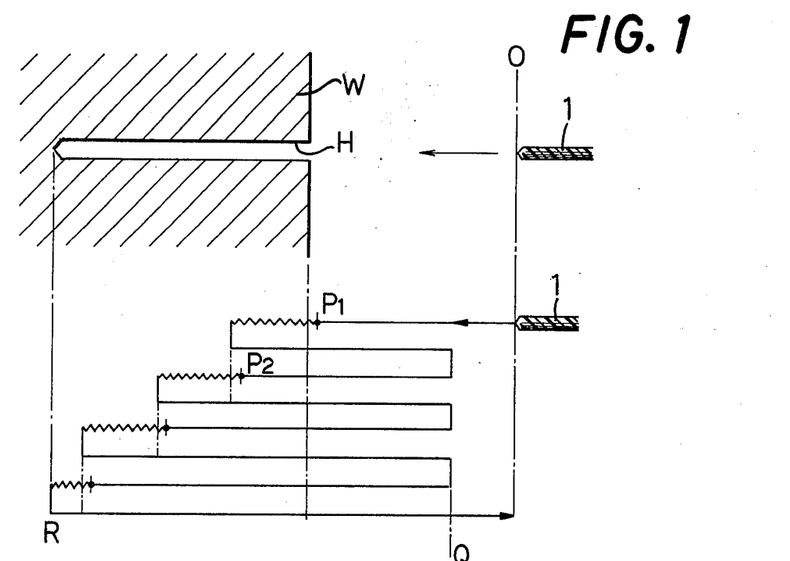
FIG. 1 is a diagram showing the step feed operation according to a step feed system embodying the invention.

An embodiment of this invention applied to a drilling machine will be described hereinunder with reference to the accompanying drawings. In this embodiment, the drilling operation by the drilling machine is performed in the following manner. As shown in FIG. 1, a drill 1 positioned in an origin or the most backward position O advances toward a workpiece W at a rapid speed while it rotates, and at a first switching point $P_1$ just before reaching the workpiece W (approximately 2 mm before the workpiece in this embodiment) the above advancing speed is switched down to an optimum drilling speed and at this speed the drilling is started. In the course of this drilling operation, if a load, i.e., a cutting torque above a certain level in a direction opposite to the rotational direction is applied to the spindle having the drill 1, the drill 1 returns at a rapid speed to a predetermined turning point Q positioned between the origin O and the first switching point $P_1$, then from the turning point Q the drill 1 advances at a rapid speed to a second switching point $P_2$ just before reaching the bottom of the first drilled bore (approximately 2 mm before the bottom like the previous case). Thereafter, the advancing speed is switched down to an optimum drilling speed as in the previous case and at this speed the drilling operation is performed, and when the load above a certain level is applied again to the drill 1, the drill 1 returns to the turning point Q at a rapid speed. In this way, such an operation is repeated until a predetermined depth (the most forward position) R is reached, and upon completion of drilling up to the depth R the drill 1 returns to the origin O at a rapid speed.

Figure 2A:
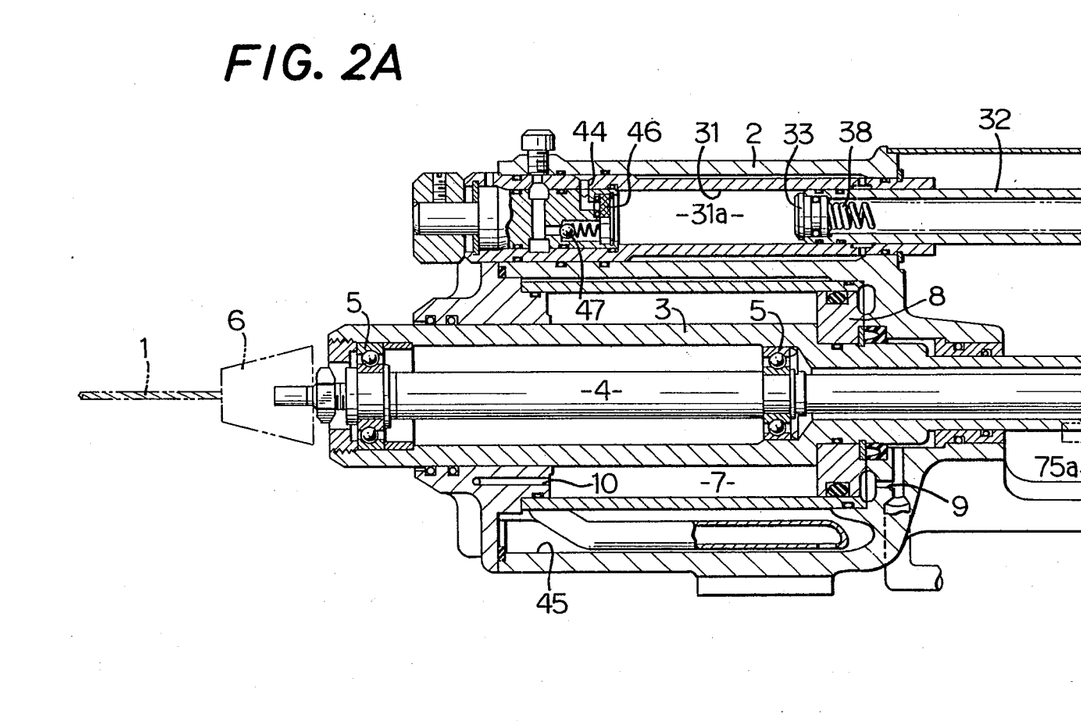
FIGS. 2A and 2B are an axial sectional view of a drilling machine to which the invention was applied.
Figure 2B:
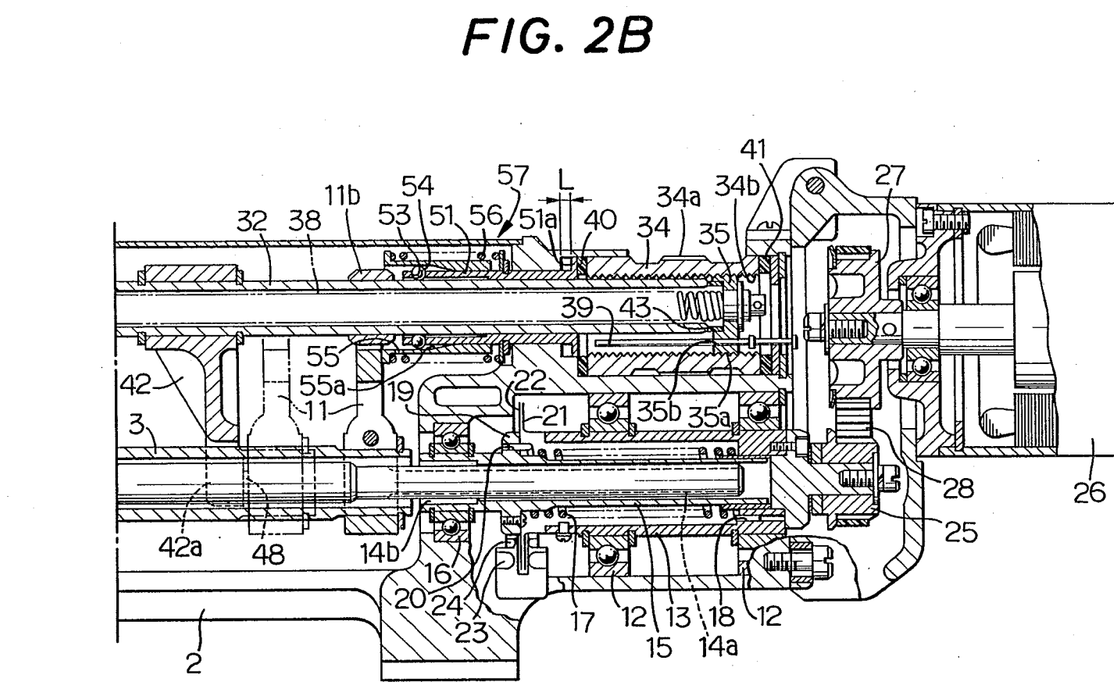

The construction of the drilling machine in this embodiment will be described hereinunder with reference to FIG. 2 et seq. A quill 3 is supported by a frame 2 of the drilling machine so as to be slidable in the axial direction, and in the position of axis within the quill 3 there is inserted a spindle 4 which is rotatably carried by bearings 5. The drill 1 is held by a chuck 6 which is affixed to the front end of the spindle 4. In this specification, the left side of FIG. 2 is assumed to be forward.

The front end portion of the quill 3 is being inserted into an air cylinder chamber 7 formed within the frame 2, and a piston head member 8 is fixed to the outer periphery of the quill 3 within the cylinder chamber 7. Air is supplied from a first passage 9 to the rear side of the piston head member 8 whereby the quill 3 moves forward at a rapid speed together with the spindle 4, while air is supplied from a second passage 10 to the front side of the piston head member 8 whereby the quill 3 is moved backward at a rapid speed together with the spindle 4. That is to say, air drive means for moving the quill 3 forward and backward in its axial direction is constituted of the air cylinder chamber 7, the piston head member 8 and an air source. To the rear end of the quill 3 there is fixed an abutment 11.

At the rear portion of the frame 2 and on the same axis as the spindle 4 there is rotatably mounted a rotary sleeve 13 via a pair of ball bearings 12. Within the rotary sleeve 13 there is disposed a connecting sleeve 15, which extends along the same axis as the rotary sleeve 13, and its rear end is rotatably supported by the rotary sleeve 13, while the front end of the connecting sleeve 15 is supported by the frame 2 via a ball bearing 16. Furthermore, the rear end portion of the spindle 4 is inserted in the connecting sleeve 15. The spindle 4 and the connecting sleeve 15 is coupled by a spline 14a and a spline key 14b for integral rotation and relative movement in the axial direction. Around the connecting sleeve 15 there is wound a coiled transmission spring 17 concentrically with a slight clearance therebetween, and one end of the spring 17 is retained in a retaining hole 18 of an inward flange formed on the internal surface of the rotary sleeve 13, while the other end thereof is retained in a retaining hole 20 of an outward flange 19 formed on the outer periphery of the connecting sleeve 15, and the rotation of the rotary sleeve 13 is transmitted by way of the transmission spring 17 to the connecting sleeve 15 and to the spindle 4. Consequently, in case a load is applied to the spindle 4 in its rotational direction, a relative rotational or angular displacement proportional to the load is made between the rotary sleeve 13 and the connecting sleeve 15 against the spring force in the torsional direction of the transmission spring 17. If a load exceeding a certain level is applied to the wind-up direction of the transmission spring 17, the spring 17 will wind closely about the outer periphery of the connecting sleeve 15 to prevent its further torsion, that is, the spring 17 is prevented from being twisted beyond its torsional limit whereby the damage and breakage of the spring 17 can be prevented.

At the flange 19 of the connecting sleeve 15 and at the front end portion of the rotary sleeve 13 there are mounted a wheel disk 21 having a plurality of light passing slits arranged on a circle and a shutter disk 22 for shutting those slits respectively in opposed relation to each other. With both disks 21 and 22 interposed, there are disposed an angular displacement detecting photocoupler 23 and a resetting photocoupler 24. If there is a relative angular displacement between the disks 21 and 22 due to a relative rotational displacement between the rotary sleeve 13 and the connecting sleeve 15, number of slits detecting in each rotation of the disk 21 or 22 by the angular displacement detecting photocoupler 23 is varied. Number of signal pulses from the photocoupler 23 is counted by a counter, which is reset by a signal from the resetting photocoupler 24 in every rotation of the disk 21 or 22. The method and apparatus for detecting torque transmitted from the rotary sleeve 13 to the spindle 4 via the connecting sleeve 15 are disclosed in detail in the U.S. patent application filed on Oct. 9, 1981 by this inventor with another co-inventors and have no direct bearing on this invention, so detailed explanation therefor is omitted here. When the counted content of the counter exceeds a predetermined number an overload signal is output, and due to the output signal air is fed through the second passage 10 to the front side of the piston head member 8 for returning the quill 3 quickly.

At the rear end of the rotary sleeve 13 there is mounted a pulley 25, while at the rear end of the frame 2 there is disposed a three-phase induction spindle motor 26, with a pulley 27 being mounted on the motor shaft, and a toothed belt 28 is stretched between the pulleys 25 and 27 for transmitting the rotation of the spindle motor 26 to the rotary sleeve 13.

In the front portion of the frame 2 there is disposed a hydraulic cylinder housing 31 having a chamber 31a adjacent to the air cylinder chamber 7 so as to have an axis parallel to that of the air cylinder chamber 7, and a hollow ram 32 rearwardly extends from the cylinder chamber 31a. A plug 33 is fitted into an opening portion formed in the front end of the hollow ram 32.

Figure 8:
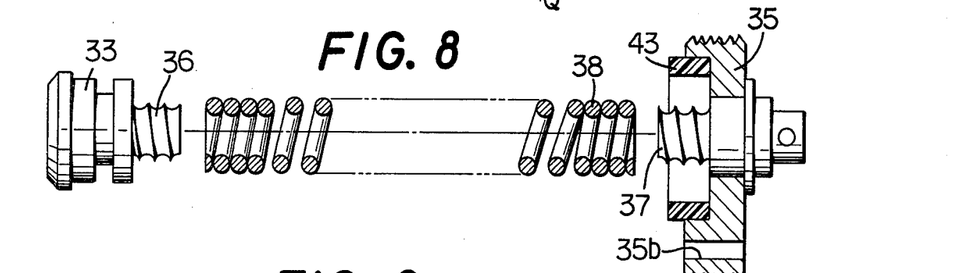
FIG. 8 is an exploded sectional view on a large scale showing the relationship of a cap and a movable member to a coiled spring in the drilling machine.

In the rear portion of the frame 2 there is disposed a cylindrical adjusting member 34 for rotational operation, the adjusting member 34 having an operating portion 34a on the outer periphery thereof and also having internal threads 34b on the internal surface thereof. The rear end portion of the hollow ram 32 is loosely fitted into the adjusting member 34. Within the adjusting member 34 there is disposed a movable member 35 which has external threads 35a formed on its outer periphery, the external threads 35a being in engagement with the internal threads 34b. As shown in FIG. 8, protrusions 36 and 37 are formed on the opposed surfaces of the cap 33 and the movable member 35, respectively, and a coiled spring 38 is anchored between the protrusions 36 and 37 whereby the hollow ram 32 is normally urged rearwards via the cap 33.

To the movable member 35 there is affixed a cushioning member 43 for receiving the rear end surface of the hollow ram 32. The protrusion 37 of the movable member 35 shown in FIG. 8 is disposed in an eccentric position with respect to the center of the movable member 35, and a restriction rod 39 is supported by the frame 2, the restriction rod 39 extending forward through a restriction hole 35b formed in the movable member 35, whereby the rotation of the movable member 35 is prevented. Consequently, by rotating the adjusting member 34 the movable member 35 is moved forward or backward whereby the return position of the rear end of the hollow ram 32 shown in FIG. 2 is adjusted in the longitudinal direction. After this adjustment the adjusting member 34 is fixed to the frame 2 by a suitable fixing member. On both front and rear sides of the adjusting member 34 there are respectively mounted rings 40 and 41 having a small friction coefficient to prevent the adjusting member 34 from moving in axial direction.

Figure 6:
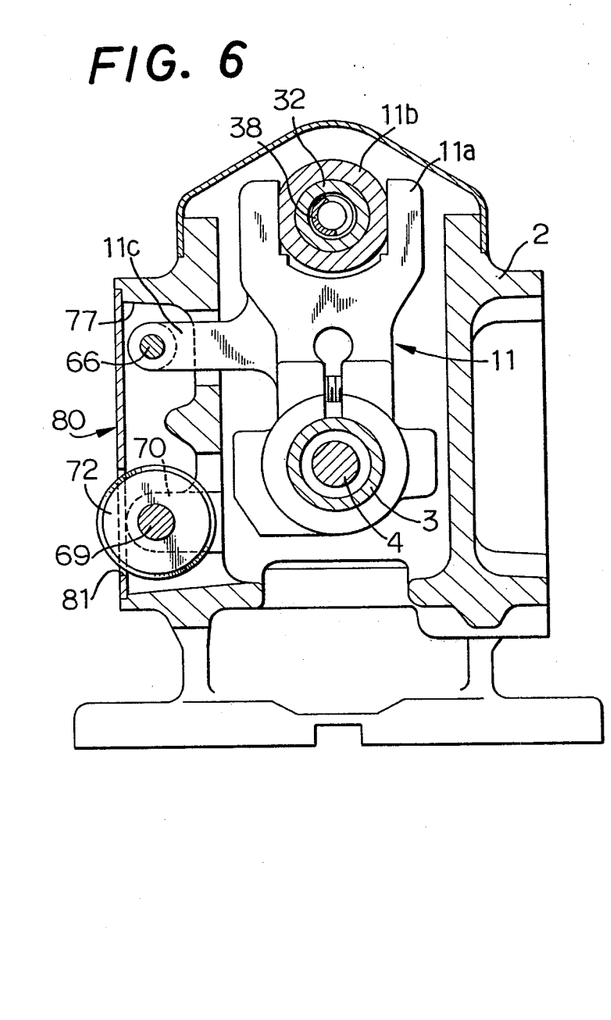
FIG. 6 is an enlarged sectional view taken on line 6—6 of FIG. 3.
Figure 7:
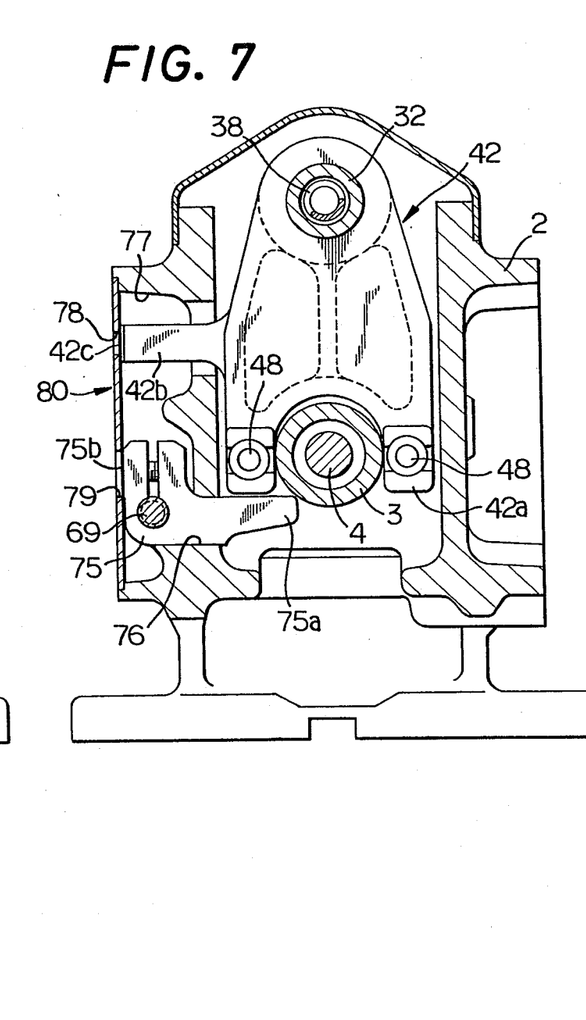
FIG. 7 is an enlarged sectional view taken on line 7—7 of FIG. 3.

Onto the outer periphery of an approximately intermediate portion of the hollow ram 32 there is fixed an engaging piece 42, which is provided with, as shown in FIG. 7, a bifurcated position 42a extending so as to be positioned with slight gaps on both sides of the quill 3. As shown in FIG. 6, moreover, a bifurcated portion 11a is formed at the upper end portion of the abutment 11, and to the bifurcated portion 11a there is fixed a sleeve 11b through which is slidably inserted the hollow ram 32. As the quill 3 moves forward, the lower end portion of the abutment 11 comes into engagement with the bifurcated portion 42a of the engaging piece 42 whereby the hollow ram 32 is moved forward integrally with the quill 3. A pair of cushioning members 48 are affixed to the rear sides of the bifurcated portion 42a of the engaging piece 42, and the abutment 11 is brought into engagement with the cushioning members 48.

On the front side of the hydraulic cylinder housing 31 there is disposed a flow control valve 44. As the hollow ram 32 is moved forward, the pressure oil within the hydraulic cylinder chamber 31a is discharged through the flow control valve 44 while its flow rate is controlled, and the discharged pressure oil is supplied and stored into an oil sump 45 which is disposed on the opposite side to the hydraulic cylinder chamber 31a with the air cylinder chamber 7 interposed therebetween. According to the flow-adjusting throttle action of the flow control valve 44 the advancing speed of the hollow ram 32 is restricted; that is, after engagement of the abutment 11 with the engaging piece 42 in the course of the forward movement of the quill 3 together with the spindle 4 which carries the drill 1, the advancing speed of the quill 3 is switched down and its speed is set to an optimum drilling speed. Consequently, the position of the drill 1 at the time of engagement of the abutment 11 with the engaging piece 42 induced by the forward movement of the quill 3 is the first switching point $P_1$ shown in FIG. 1. On the inflow side of the flow control valve 44 there is mounted a filter 46.

On the front side of the hydraulic cylinder housing 31 there is disposed a check valve 47 which allows the flow of pressure oil only in the direction from the oil sump 45 to the hydraulic cylinder chamber 31a thereby permitting the backward movement of the hollow ram 32.

Figure 4:
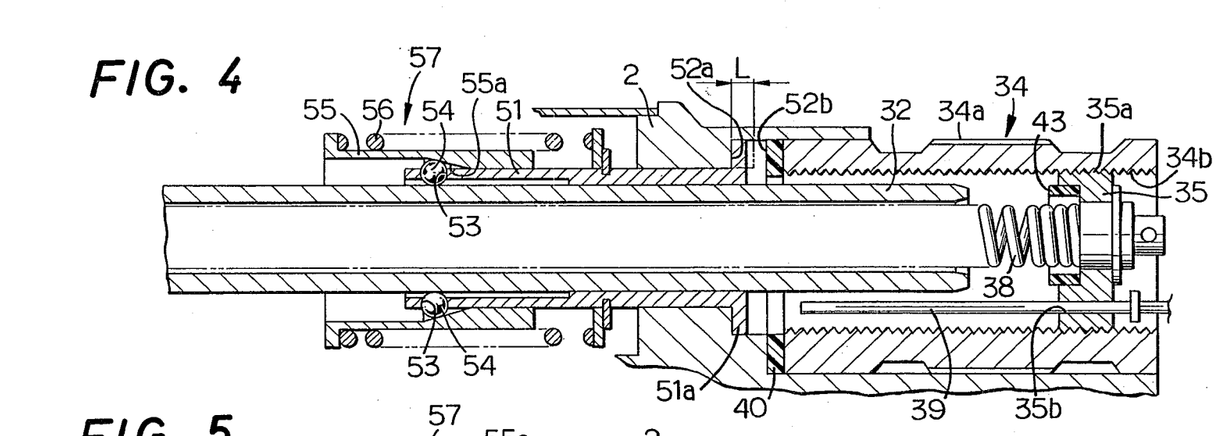
FIGS. 4 and 5 are respectively a partially enlarged axial sectional view showing an operation mode of a one-way clutch in the drilling machine.
Figure 5:
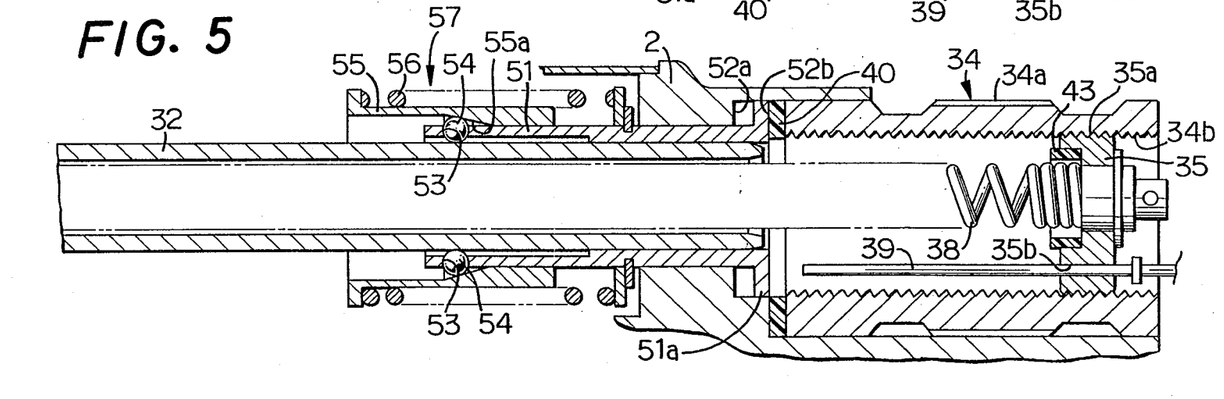

At a portion intermediate between the movable member 35 and the engaging piece 42 a sleeve 51 is fitted over the hollow ram 32 so that the hollow ram 32 may be axially slidable, and it is axially slidably supported by the frame 2. At the rear end of the sleeve 51 there is formed a flange portion 51a. As shown in FIGS. 4 and 5, the frame 2 and the ring 40 are provided with restriction surfaces 52a and 52b respectively in opposed manner to the front and rear surfaces of the flange portion 51a. The spacing between the restriction surface 52a and 52b determines a movable distance L of the flange portion 51a. In the peripheral wall of the front end portion of the sleeve 51 there are formed a plurality of retaining through holes 53 at equal intervals in the circumferential direction, and in each of those holes there is retained a steel ball 54 rotatably.

A cylindrical slide, a ball pressing member, 55 is carried on the outer periphery of the sleeve 51 so as to be slidable in the axial direction and on its inner surface there is formed a tapered or conical internal surface 55a which is gradually divergent toward the advancing direction of the quill 3 and which is engageable with the balls 54. The slide 55 is forwardly biased by a coiled spring 56, and when the quill 3 is disposed in the origin position O and the abutment 11 is in its most backward position, the slide 55 is moved backward by the abutment 11 against the biasing force of the coiled spring 56. The balls 54, the slide 55 and the coiled spring 56 constitute a one-way clutch 57 which allows a relative movement of the hollow ram 32 to the sleeve 51 when the hollow ram 32 moves forward and which, when the hollow ram 32 moves backward, allows an integral movement of the sleeve 51 and the hollow ram 32 by the allowed moving distance L of the sleeve 51 and thereafter prevents a further movement. More detailed function of the one-way clutch 57 which functions as the coupling means will be described later.

Figure 3:
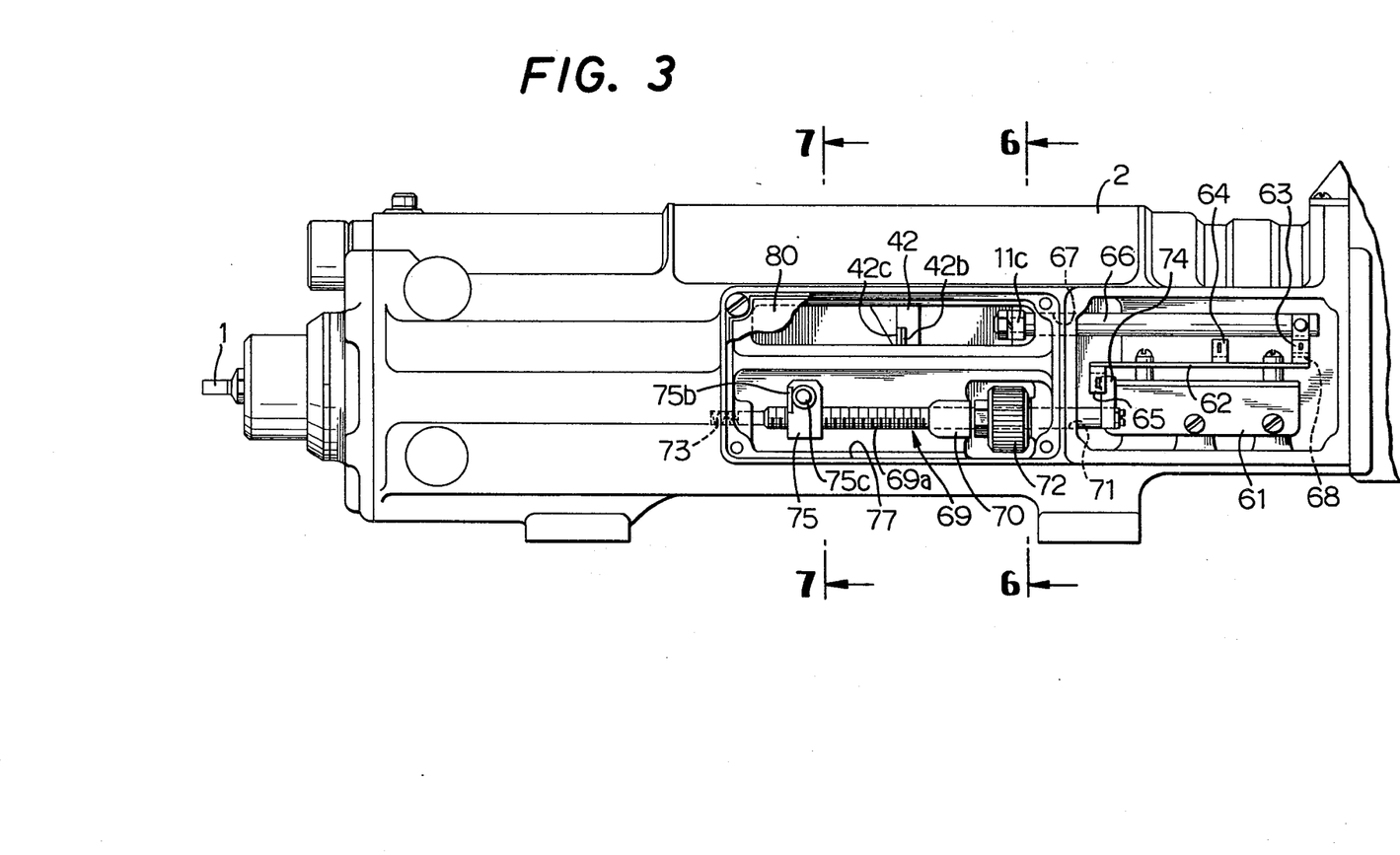
FIG. 3 is a partially cutaway elevational view of the drilling machine.

As shown in FIG. 3, to the rear part of the frame 2 there is fixed a mounting plate 62, which is a printed board, through a bracket 61. On a rear end portion of the upper surface of the mounting plate 62 there is disposed an origin or most backward position detecting photocoupler 63, and on an intermediate portion of the same upper surface there is disposed a turning-point position detecting photocoupler 64, and on the front end portion of the lower surface thereof there is disposed a most forward position detecting photocoupler 65.

As shown in FIGS. 3 and 6, an arm portion 11c is formed projectionally from one side edge of the abutment 11, and to the free end of the arm portion 11c there is fixed a mounting rod 66 which extends to the rear through a guide hole 67 formed in the frame 2. To the rear end of the mounting rod 66 there is fixed a rear shutter piece 68 which, as a result of forward and backward movement of the mounting rod 66, is capable of getting in between a light emitting diode and a phototransistor of the most backward position detecting photocoupler 63 and of the turning-point position detecting photocoupler 64, and shutting the light emitted from the light emitting diode.

Below the front portion of the mounting rod 66 there is disposed an adjusting rod 69 which extends parallel to the quill 3. The adjusting rod 69 is carried at an approximately intermediate portion thereof by a bearing 70 which is integral with the frame 2, and a portion thereof near its rear end is carried in a guide hole 71 formed in the frame 2, whereby the adjusting rod 69 is made rotatable and slightly movable back and forth. Between the bearing 70 and the guide hole 71 there is mounted an operating knob 72 on the adjusting rod 69 for turning the latter. On the outer periphery of the adjusting rod 69 ahead of the bearing 70 there is formed a threaded portion 69a, and the spring force of a coiled spring 73 acts on the front end of the adjusting rod 69 to urge the latter toward the rear. Furthermore, to the rear end of the adjusting rod 69 there is fixed a front shutter piece 74 which is normally positioned slightly out of the gap between a light emitting diode and a phototransistor of the most forward detecting photocoupler 65 and which, upon a slight forward movement of the adjusting rod 69, shuts light emitted from the light emitting diode to the phototransistor.

As shown in FIGS. 3 and 7, a stroke dog 75 is mounted on the threaded portion 69a of the adjusting rod 69, and an arm portion 75a formed integrally with the lower portion thereof extends as far as near the quill 3 through a slit 76 formed in the frame 2. Consequently, by turning the adjusting rod 69 with the operating knob 72 the position of the stroke dog 75 can be adjusted in the longitudinal direction of the adjusting rod 69, and after this adjustment the stroke dog 75 is clamped with a clamp screw 75c to prevent its movement. The abutment 11 as it advances together with the quill 3 comes into engagement with the arm portion 75a of the stroke dog 75 whereby the adjusting rod 69 is moved forward.

The wheel disk 21, the shutter disk 22, the angular displacement detecting photocoupler 23, the turning-point position detecting photocoupler 64, the rear shutter piece 68, etc. constitute step feed control means for reciprocating the quill 3 without returning it to the most backward position. On the other hand, the stroke dog 75, the most forward position detecting photocoupler 65, the front shutter piece 74, etc. constitute means for nullifying the aforesaid step feed control means on the basis of a detected signal of the most forward drilling position of the quill 3. Detailed function of these means will be described later together with that of the on-way clutch 57.

Figure 9:
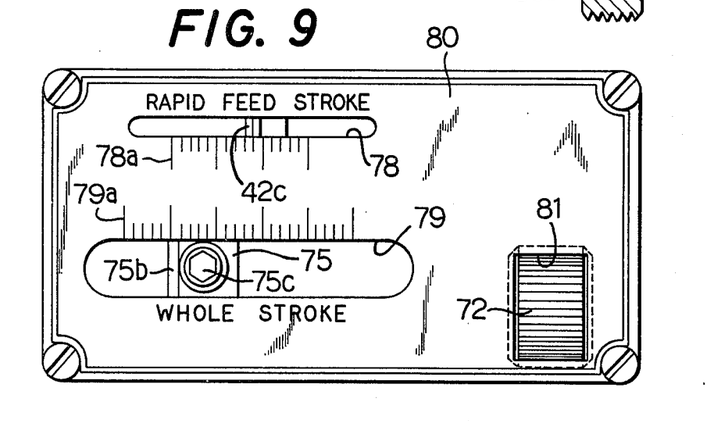
FIG. 9 is an enlarged front view of a display panel of the drilling machine.

As shown in FIG. 3, an opening 77 is formed in the frame 2 in corresponding relation to the moving range of the engaging piece 42 and to the adjusting rod 69, and the opening 77 is covered by a display panel 80 shown in FIG. 9. In the display panel 80 there are formed two long apertures 78 and 79 with graduations 78a and 79a printed respectively along one side edges thereof, and there is also formed a rectangular aperture for allowing a part of the operating knob 72 to project to the exterior. Through the upper long aperture 78 an indication line 42c formed on the arm portion 42b of the engaging piece 42 can be seen, while through the lower long aperture 79 an indication line 75b formed on the stroke dog 75 can be seen, whereby the first rapid feed stroke and total movement stroke of the drill 1 can be perceived respectively.

The following description is now provided to explain the operation of the drilling machine having the above construction. For drilling a desired depth of a bore H shown in FIG. 1, first in conformity with the desired depth of the bore H the adjusting rod 69 is rotated with the operating knob 72 shown in FIG. 3 to adjust the position of the stroke dog 75; that is, this adjustment is made so that when the quill 3 has advanced and the drill 1 reached the desired depth of the bore H formed, the abutment 11 on the quill 3 comes into engagement with the arm portion 75a of the stroke dog 75. After this adjustment, the clamp screw 75c is tightened.

Following the adjustment of the stroke dog 75, the adjusting member 34 shown in FIG. 2 is rotated thereby allowing the hollow ram 32, while being abutted on the movable member 35 by the biasing force of the coiled spring 38, to move back and forth to adjust the longitudinal position of the engaging piece 42 on the hollow ram 32; that is, this adjustment is made so that when the drill 1 has advanced for performing the first drilling operating and its tip end reached a position a little (about 2 mm) short of the face of the workpiece W, the abutment 11 comes into engagement with the engaging piece 42. This is the way of setting the first switching point $P_1$.

In this state, the slide 55 of the one-way clutch 57, due to its engagement with the abutment 11, is moved backward against the biasing force of the coiled spring 56 and its conical internal surface 55a is away from the balls 54.

If the spindle motor 26 is started in this state, the rotary sleeve 13 is rotated, so the connecting sleeve 15 and the spindle 4 are rotated through the transmission spring 17 and hence the drill 1 is rotated. A little later, the supply of air is switched from the second passage 10 to the first passage 9 whereby the quill 3 is moved forward at a rapid speed and the drill 1 is advanced at a rapid feed.

As the abutment 11 is separated from the slide 55 along with the forward movement of the quill 3, the slide 55 is moved forward by virtue of the biasing force of the coiled spring 56 and the conical internal surface 55a comes into engagement with the balls 54, so the balls 54 are held between the conical internal surface 55a and the outer peripheral surface of the hollow ram 32.

In other words, the slide 55 and the sleeve 51 are coupled with the hollow ram 32 through the balls 54 of the one-way clutch 57 so that, as shown in FIG. 4, the slide 55 and the sleeve 51 are moved forward by the distance L (about 2 mm) until the flange portion 51a of the sleeve 51 engages the front restriction surface 52a. The subsequent advancing force of the hollow ram 32 acts on the balls as a turning force in the direction of arrow in the same figure, and therefore this turning force acts on the slide 55 as a force in the opposite direction to the coupling direction, thus permitting the subsequent forward movement of only the hollow ram 32.

On the other hand, along with the forward movement of the abutment 11, the mounting rod 66 shown in FIG. 3 also moves forward, so that the rear shutter piece 68 moves forward from the position of the most backward position detecting photocoupler 63, past the turning-point position detecting photocoupler 64.

In this way, when the drill 1 reaches the first switching point $P_1$, the abutment 11 engages the engaging piece 42 and an advancing force is imparted to the hollow ram 32. In this case, the hollow ram 32 undergoes a throttle action of the flow control valve 44 and therefore it can move only at a slower cutting feed speed than the advancing speed of the quill 3 due to the action of air, so that the advancing speed of the quill 3 may be also switched down to the cutting feed speed. Thus, the advancing speed of the drill 1 is switched to the cutting feed speed at the switching point $P_1$ just before it reaches the workpiece W, and at that speed the drill 1 starts drilling.

As the first drilling proceeds in this way, the load in the opposite direction to the rotational direction applied to the drill 1 increases gradually and rotational displacements are produced little by little between the connecting sleeve 15 and the rotary sleeve 13, thus causing changes in the relative angular displacement between the wheel disk 21 and the shutter disk 22. When the load applied to the drill 1 has reached a predetermined value, the counter connected to the angular displacement detecting photocoupler 23 outputs an overload signal in the aforesaid manner, and due to this overload signal there is supplied air through the second vent hole 10 to the front side of the piston head member 8 whereby the quill 3 is moved backward at a rapid speed and the drill 1 returns quickly. Due to backward movement of the abutment 11 along with returning of the quill 3, the mounting rod 66 having the rear shutter piece 68 shown in FIG. 3 is also moved backward.

As the quill 3 is returned and the abutment 11 is separated from the engaging piece 42, the hollow ram 32 tends to move backward by virtue of the biasing force of the coiled spring 38, and consequently the hollow ram 32 is moved backward together with the sleeve 51 and the slide 55 as is shown in FIG. 5, but when the backward movement of the sleeve 51 is restricted upon its engagement with the rear restriction surface 52b after its backward movement by the distance L (about 2 mm), the balls 54 undergo a rotational force in the direction of arrow in the same figure. This rotational force acts on the slide 55 as a force for moving the slide 55 forward and eventually acts as a force for urging the balls 54 to the outer peripheral surface of the hollow ram 32, so that the hollow ram 32 is prevented from further returning and it is stopped in the position returned by the distance L. That is, the engaging piece 42 is also stopped in the position retreated by the distance L from the position wherein the drilling operation has been suspended.

When the mounting rod 66 has returned and the rear shutter piece 68 reached the position of the turning-point position detecting photocoupler 64, a detection signal is output from the photocoupler 64 and due to this output signal the supply of air is switched from the second passage 10 to the first passage 9, causing thus the operation to be switched into a quick forward feed of the drill 1.

This forward movement of the drill 1 causes the abutment 11 to be engaged again with the engaging piece 42, but since the position of the engaging piece 42 is on this side of the previous drilling end position by the distance L, the transfer to the cutting feed speed upon engagement of the abutment 11 with the engaging piece 42 is performed this side of the bottom of the previously formed bore by the distance L (second switching point $P_2$). Therefore, the drill 1 will never strike against the workpiece W at a rapid speed.

In this way, the drill 1 is switched to a cutting feed and the drilling operation is performed, and when the load applied to the drill 1 has reached a predetermined value, the angular displacement detecting photocoupler 23 outputs an overload signal in the same way as previously stated and the drill 1 is thereby retreated quickly, and when the rear shutter piece 68 of the mounting rod 66 has reached the position of the turning-point position detecting photocoupler 64, the drill 1 is switched to a rapid forward feed.

When the drill 1 has reached the desired depth R after such plural times of step feed drilling, the abutment 11 abuts the arm portion 75a of the stroke dog 75 which has been positioned in advance, whereby the adjusting rod 69 is moved slightly forward through the stroke dog 75 against the biasing force of the coiled spring 73, and the front shutter piece 74 shuts light emitted from the light emitting diode of the most forward position detecting photocoupler 65 and a detection signal is output. Due to this output signal, the operation of the turning-point position detecting photocoupler 64 is nullified and air is supplied to the front side of the piston head member 8 through the second passage 10, so the drill 1 returns quickly and the rear shutter piece 68 passes the turning-point position detecting photocoupler 64. Consequently, the drill 1 further returns beyond the turning-point Q, and when the rear shutter piece 68 has reached the position of the most backward position detecting photocoupler 63, a detection signal is output and the rotation of the spindle motor 26 is stopped, so that the drill 1 returns to the origin (the most backward position) 0 and is stopped. The rotation thereof is discontinued at the origin O.

Due to return of the abutment 11 along with return of the quill 3 to the most backward position O, as previously stated, the hollow ram 32 and the sleeve 51 are moved backward by the distance L and thereafter the abutment 11 engages the slide 55, thus moving the latter backward against the biasing force of the coiled spring 56, and the conical internal surface 55a is separated from the balls 54, so that the one-way clutch 57 and the hollow ram 32 are disconnected from each other and the hollow ram 32 returns to its rear end position shown in FIG. 2 by virtue of the biasing force of the coiled spring 38. Thus, one drilling process is completed.

In this drilling machine, as set forth hereinbefore, when the cutting resistance exceeds a predetermined value, a further drilling operation is interrupted, and the switching from rapid feed to slow cutting feed is performed a little before the drill 1 contacts the face of the workpiece W or the bottom of a previously drilled bore, so the drill 1 will never strike at a rapid speed against the face of the workpiece W or the bottom of the bore. Consequently, the breakage of the drill 1 can surely be prevented and a safe operation is thereby assured.

In this embodiment, the abutment 11 is used as means for nullifying the action of the one-way clutch 57 by moving the slide 55 backward against the coiled spring 56, but there may be constructed so that the one-way clutch is nullified by moving the slide 55 with a solenoid or the like operated with a detection signal from the most forward position detecting photocoupler 65 corresponding to the movement of the quill 3 to its most forward position.

What is claimed is:

1. A drilling machine comprising:
    a frame;
    a quill reciprocably mounted in the frame;
    a spindle rotatably mounted in the quill and having a tool at one end thereof;
    a motor operatively connected with the spindle for rotating the same;
    pneumatic feed means for reciprocating the quill in forward and backward directions;
    feed control means for controlling feed speed of the quill, including a rod member which is regulated of its forward movement speed at a predetermined value by regulating means and biasing means for always biasing said rod in backward direction, and engaging means for engaging the quill with the rod member in the course of forward movement thereof;
    a slidable member movably disposed within a predetermined distance in movement direction of the rod member;
    coupling means for coupling the slidable member to the rod member to move the slidable member with the rod member by the predetermined distance when the rod member moves in forward direction of the quill and thereafter for permitting the rod member to forwardly move relatively to the slide member, said coupling means having means to couple said slidable member to the rod member to move the former with the latter by the predetermined distance when the rod member moves in backward direction by the biasing means and then to stop backward movement of the rod member; and
    operation control means for controlling the pneumatic feed means to make the quill repeat a drilling cycle wherein the quill once returns on the way of drilling operation and advances again for resuming the drilling operation.

2. A drilling machine according to claim 1, wherein said regulating means comprises:
    a hydraulic cylinder having a housing disposed in parallel with the axis of the quill and connected to a liquid tank at one end thereof through a liquid passage, and a ram disposed within the housing and having a portion projecting from the other end of the housing, the projecting portion functioning as said rod member; and
    a flow regulator disposed in the liquid passage for regulating flow of liquid from the hydraulic cylinder to the liquid tank and allowing free-flow of the liquid from the liquid tank to the hydraulic cylinder.

3. A drilling machine comprising:
    a frame;
    a quill reciprocably mounted in the frame;
    a spindle rotatably mounted in the quill and having a tool at one end thereof;
    a motor operatively connected with the spindle for rotating the same;
    pneumatic feed means for reciprocating the quill in forward and backward directions;
    feed control means for controlling feed speed of the quill, including;
    (a) a hydraulic cylinder having a housing disposed in parallel with the axis of the quill and connected to a liquid tank at one end thereof through a liquid passage, and a ram disposed within the housing and having a portion projecting from the other end of the housing,
    (b) means for biasing the ram in backward direction,
    (c) flow regulating means disposed in the liquid passage for regulating flow of liquid from the hydraulic cylinder to the liquid tank and allowing free-flow of the liquid from the liquid tank to the hydraulic cylinder, and
    (d) engaging means for engaging the quill with the projecting portion of the ram when the quill arrives at a desired position in the forward movement thereof,
    whereby the quill is moved at a rapid speed by the pneumatic feed means until it engages with the projecting portion of the ram and then is moved at a slow speed controlled by the flow regulating means,
    position sensing means for generating a sensing signal when the quill has been moved to the most forward position;
    a slidable member mounted on the frame for movement within a predetermined distance in movement direction of the projecting portion of the ram;
    coupling means mounted on the slidable member for coupling the slidable member to the ram to move the slidable member with the ram by the predetermined distance when the ram moves in forward direction of the quill and thereafter for permitting the ram to forwardly move relatively to the slide member, said coupling means having means to couple said slidable member to the ram to move the former with the latter by the predetermined distance when the ram moves in backward direction by the biasing means and then to stop backward movement of the ram; and
    operation control means for controlling the pneumatic feed means to make the quill repeat a drilling cycle wherein the quill once returns on the way of drilling operation and advances again for resuming the drilling operation, and then returns the quill to the most backward position in response to the sensing signal from the position sensing means, said coupling means being adapted to release the stop operation for permitting backward movement of the ram after the position sensing means generates the sensing signal.

4. A drilling machine according to claim 1, wherein the slidable member consists in a sleeve member slidably fitted on the ram and has several through-bores radially formed therein;

the coupling means comprises;
- (a) balls positioned in each of the several through-bores,
- (b) a ball pressing member slidably mounted on the sleeve member and having a conical internal surface which gradually expands in forward direction of the quill for engaging with the balls,
- (c) a spring member interposed between the ball pressing member and the sleeve member for biasing the ball pressing member in forward direction of the quill, and
- (d) engaging portion provided on the ball pressing member to engage with the quill so as to move the ball pressing member with the quill in backward direction thereof when the quill returns to the most backward position, whereby the conical internal surface of the ball pressing member normally presses the balls toward the ram so as to prevent the movement of the ram in backward direction of the quill, and the conical internal surface of the ball pressing member releases the pressure against the balls when the ball pressing member is moved by the quill in backward direction thereof against the action of the spring member so as to permit the movement of the ram in backward direction of the quill.

5. A drilling machine according to claim 4, wherein the sleeve member has a flange portion formed on the rear end thereof for engaging with the frame when said sleeve member moves by the predetermined distance in the moving direction of the ram.

6. A drilling machine according to claim 3, wherein the operation control means comprises:

a torque sensing means for generating a signal when a torque beyond a predetermined value is applied to the spindle in the forward movement of the quill;

turning-point sensing means for generating a signal when the quill is retracted to a predetermined turning-point position this side of the most backward position of the quill; and means for controlling the pneumatic feed means so as to retract the quill in response to the signal from the torque sensing means and advance the quill again in response to the signal from the turning-point sensing means for resuming the drilling operation.

* * * * *